T. VARNEY.
TROLLEY FOR ELECTRIC VEHICLES.
APPLICATION FILED APR. 22, 1908.
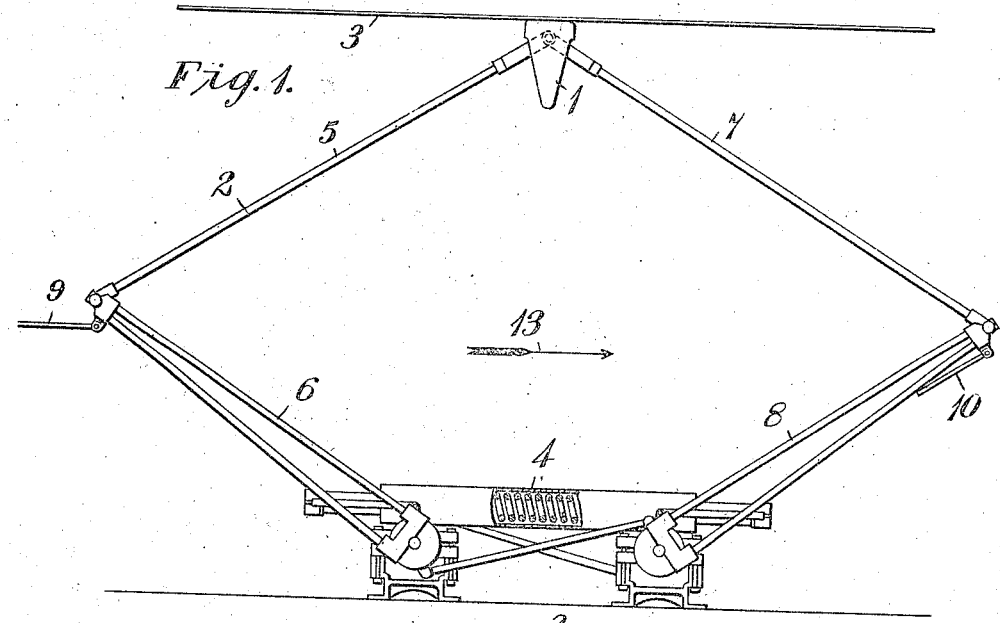
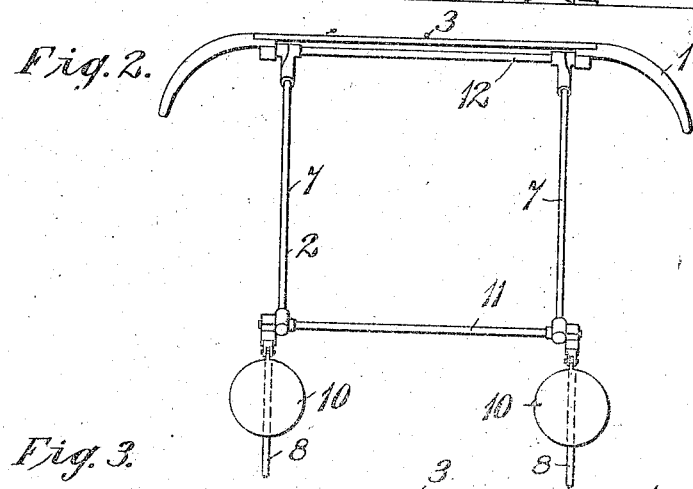
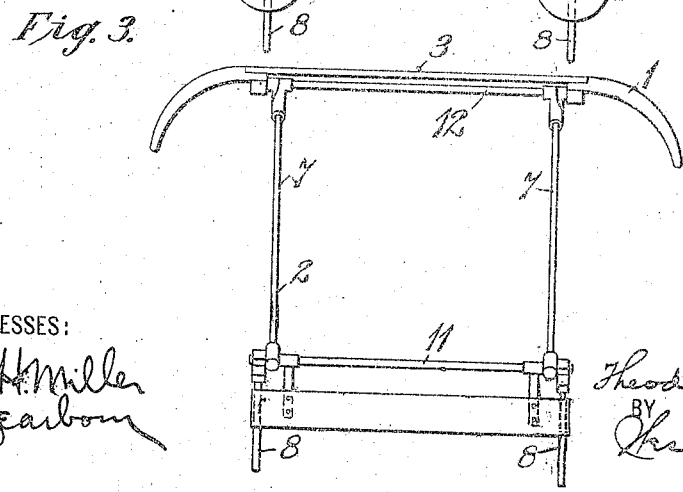

UNITED STATES PATENT OFFICE.

THEODORE VARNEY, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY FOR ELECTRIC VEHICLES.

932,655.   Specification of Letters Patent.   Patented Aug. 31, 1909.

Application filed April 22, 1908. Serial No. 428,549.

*To all whom it may concern:*

Be it known that I, THEODORE VARNEY, a citizen of the United States, and a resident of Pittsburg, in the county of Allegheny and State of Pennsylvania, have invented a new and useful Improvement in Trolleys for Electric Vehicles, of which the following is a specification.

My invention relates to trolleys for electrically-propelled vehicles, and it has for its object to provide a simple and durable device for use in connection with a trolley of the well-known pantograph type whereby the pressure exerted between the contact member and the supply conductor may be made automatically dependent upon the speed at which the vehicle is operating and upon the height of the trolley wire above the vehicle.

In my co-pending application, Serial No. 296,318, I have illustrated a trolley of the so-called pantograph type having a sliding contact shoe and a supporting frame comprising a double pantograph or lazy-tongs structure, and a spring which tends to hold the contact member in engagement with the supply conductor. When trolleys of this type are operated at relatively high speeds, the contact member tends to become temporarily separated from the supply conductor on account of the inertia of the moving parts and the unavoidable irregularities in the suspension of the supply conductor. This tendency may be minimized by increasing the pressure tending to hold the contact member in engagement with the supply conductor, but the overhead trolley conductor is often dropped downward in passing through tunnels or under bridges until the distance between the top of the car and the wire is materially decreased. In order to follow the conductor, in such cases, the contact shoe is, of course, forced downwardly and the pantograph is automatically adjusted in opposition to the spring which tends to raise the contact shoe. The increased pressure which is created in this way is likely to cause grooves or furrows to be made in the contact surface of the shoe and undesirable bends or kinks to be made in the trolley conductor near its points of support.

According to my present invention, I provide an auxiliary device which is dependent upon the speed of the vehicle and the height of the conductor above the vehicle for automatically assisting, to a greater or less degree, the spring-pressure which holds the trolley shoe in engagement with the supply conductor. By the use of this device, it is, therefore, possible to operate satisfactorily with a much weaker spring pressure than would otherwise be required.

Figure 1 of the accompanying drawings is a side elevation of a pantograph trolley equipped with wind-vanes which constitute the improvement of my present invention. Fig. 2 is a front elevation of a portion of the device shown in Fig. 1, and Fig. 3 is a view, similar to Fig. 2, of a modified form of wind-vane substituted for that shown in the other figures.

Referring to the drawings, the device illustrated comprises a sliding contact shoe 1 which is mounted upon a double pantograph supporting structure 2 and is held in engagement with a supply conductor 3 by means of a spring 4.

The pantograph structure comprises the usual arms 5, 6, 7, and 8, arms 5 and 7 constituting the upper and arms 6 and 8 the lower half of the frame. At the hinge connection between the upper and lower arms, wind-vanes 9 and 10 are pivotally mounted in such a way that their movements are limited in one direction by the lower arms 6 and 8, as shown in Fig. 2. The wind-vanes are preferably constructed of sheet aluminum or some other substance which is strong and light, and they may be of circular form, as indicated in Fig. 2, or of rectangular form, as indicated in Fig. 3, or of some other outline, since the shape is immaterial to my invention.

Pantograph supporting structures for trolleys, as usually constructed, also comprise cross-rods 11 and 12 which are located at the joints of the frame and, with these structures, the wind-vanes may preferably be hung on the side rods near the middle joints or on the cross-rods 11, two or more being employed on each cross-rod, as shown in Fig. 2, or a single one extending throughout the whole length, as shown in Fig. 3.

The action of the wind-vanes is as follows: Assuming that the trolley illustrated in Fig. 1 is traveling in the direction of arrow 13, drafts of air will, of course, be directed against the wind-vanes 10 and will force them against the lower arms 8 of the frame and tend to increase the pressure exerted by the contact member 1 upon the conductor 3. The wind-vanes 9 will be forced into a plane substantially parallel to the direction of travel so that they will offer little or no resistance to the vehicle motion. When the vehicle is traveling in the reverse direction, the wind-vanes 9 will, of course, be active and the wind-vanes 10 will occupy horizontal positions.

The normal height of the trolley conductor above the vehicle is such that the pantograph is considerably extended and the angle formed between the upper and lower arms of the pantograph structure is relatively large. This will obviously keep the active wind-vane in a plane which is so nearly vertical that a maximum force will be exerted to increase the pressure between the trolley shoe and the supply conductor. When the pantograph frame is adjusted, as shown in Fig. 1, to accommodate it to a relatively low supply conductor the wind-vanes will occupy a more oblique position and, consequently, if the speed of the vehicle is maintained substantially the same as that at which it normally operates a portion of the air will be diverted and the component of forces tending to raise the contact shoe will be considerably less. It will thus be observed that the pressure which is normally determined by the spring when the vehicle is at rest is dependent, when the vehicle is in motion, upon the speed and upon the height of the trolley conductor above the vehicle.

Since various structural modifications may be effected within the spirit and scope of my invention, I desire that only such limitations shall be imposed as are indicated in the appended claims.

I claim as my invention:

1. In an electrical vehicle, the combination with a supply conductor and a current collector having a pantograph supporting frame, of wind-vanes pivotally suspended from the respective ends of said frame and dependent upon the speed of the vehicle and the height of the supply conductor above the vehicle for varying the pressure exerted upon the conductor by the collector.

2. A trolley for electric vehicles comprising a double pantograph supporting structure and a contact member secured thereto, means for expanding the supporting structure, and wind-vanes pivotally suspended from the ends of said structure.

3. In an electric vehicle, the combination with a supply conductor, a trolley comprising a double pantograph supporting structure and a contact member secured thereto, of means for exerting a pressure between the contact member and the supply conductor, and wind-vanes pivotally supported upon the ends of said structure to assist in the adjustment of the pantograph structure in accordance with the speed of the vehicle.

In testimony whereof, I have hereunto subscribed my name this 3rd day of April, 1908.

THEODORE VARNEY.

Witnesses:
WILLARD C. BRINTON,
BIRNEY HINES.